United States Patent [19]

Nakatani et al.

[11] Patent Number: 4,882,633

[45] Date of Patent: Nov. 21, 1989

[54] VIDEO SIGNAL REPRODUCING APPARATUS WITH MEMORY

[75] Inventors: Yoshihiro Nakatani; Tsutomu Fukatsu, both of Kanagawa, Japan

[73] Assignee: Canon Kabushiki Kaisha, Tokyo, Japan

[21] Appl. No.: 139,780

[22] Filed: Dec. 30, 1987

[30] Foreign Application Priority Data

Jan. 9, 1987 [JP] Japan ............................. 62-002872
Jan. 9, 1987 [JP] Japan ............................. 62-002873
Jan. 9, 1987 [JP] Japan ............................. 62-002874

[51] Int. Cl.$^4$ ............................................ H04N 5/95
[52] U.S. Cl. .................................. 358/339; 360/10.3; 360/36.2
[58] Field of Search .................. 358/312, 339, 335; 360/10.1, 10.3, 36.2, 61, 64

[56] References Cited

U.S. PATENT DOCUMENTS

| | | | |
|---|---|---|---|
| 4,134,131 | 1/1979 | Hopkins, Jr. ........................ | 358/339 |
| 4,389,678 | 6/1983 | Mizukami et al. ................... | 360/10.3 |
| 4,636,874 | 1/1987 | Hoogendoorn et al. ........... | 360/10.3 |
| 4,714,965 | 12/1987 | Yoshinaka et al. ................ | 358/339 |
| 4,731,659 | 3/1988 | Kani ................................... | 358/312 |
| 4,733,312 | 3/1988 | Morimoto .......................... | 358/339 |
| 4,772,975 | 9/1988 | Azuma ............................... | 358/312 |
| 4,788,604 | 11/1988 | Takeuchi .......................... | 358/339 |

Primary Examiner—Donald McElheny, Jr.
Attorney, Agent, or Firm—Robin, Blecker & Daley

[57] ABSTRACT

A video signal reproducing apparatus for reproducing a video signal recorded in many tracks which are formed on a record bearing medium has a high-speed video signal reproducing mode and is characterized by the inclusion of: A memory arranged to temporarily store the video signal read out from the medium by the reproducing head; a step-up circuit arranged to generate a step-up signal which is obtained by stepping up a periodic signal relative to the medium tracing period of the reproducing head; and a control circuit which is arranged to control signal writing into the memory in accordance with the step-up signal produced from the step-up circuit.

22 Claims, 11 Drawing Sheets

VIDEO SIGNAL REPRODUCING APPARATUS WITH MEMORY

BACKGROUND OF THE INVENTION

1. Field of the Invention

This invention relates to an apparatus for reproducing video signals recorded in many tracks formed on a record bearing medium and more particularly to an apparatus having a mode of reproducing the video signals at a high speed.

2. Description of the Related Art

Figure 1A:
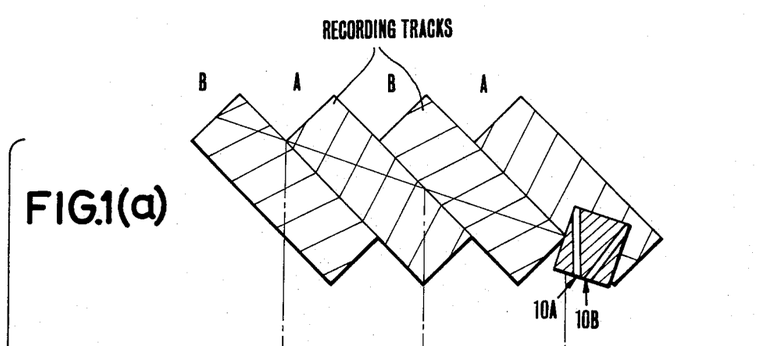
FIGS. 1(a) to 1(d) show the tracing tracks of reproducing heads obtained during high speed reproduction and the reproducing method of the conventional apparatus.
Figure 1B:
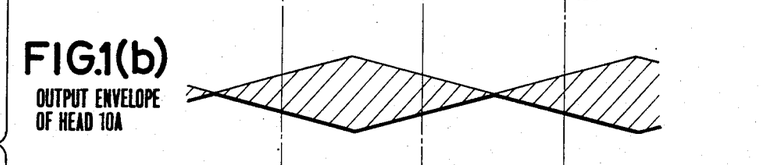
Figure 1C:
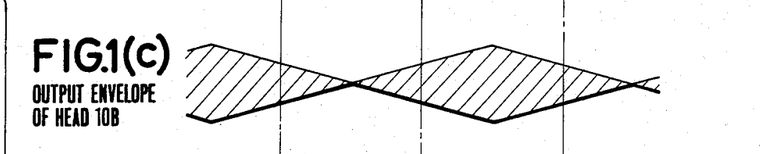

In performing a high speed reproduction with a rotary-head type video signal reproducing apparatus such as a video tape recorder (hereinafter referred to as VTR), the reproducing head of the VTR scans the medium by straddling a plurality of recording tracks obliquely formed, as shown in FIG. 1(a) of the accompanying drawings, on a magnetic tape which is travelling at a high speed. Then, in cases where these tracks have guard bands provided between them or where adjacent tracks have signals obliquely azimuth recorded there at different azimuth angles, the envelope of a modulated video signal obtained from the reproducing head periodically have small signal parts as shown in FIGS. 1(b) and 1(c). In other words, the output level of the reproduced video signal becomes extremely low when the reproducing head scans either a part between adjacent tracks or a track having signals recorded at a different azimuth angle from the azimuth angle of the head.

Figure 1D:
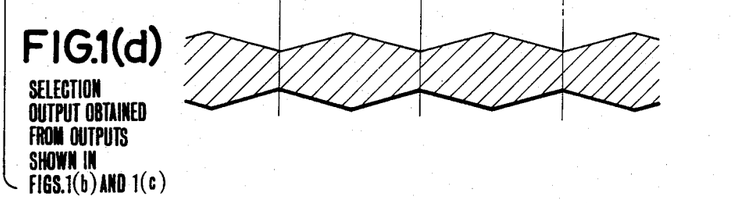

In the conventional method for improving picture quality obtainable by high speed reproduction, two magnetic heads 10A and 10B having different azimuth angles from each other are disposed close to each other; and the output of each of these heads is arranged to be taken out only when the head is scanning a track which is of the same azimuth angle as the head. Pictures without any salient noise bars have been thus obtained by this method. FIG. 1(b) shows the envelope of the output of the head 10A and FIG. 1(c) that of the output of the other head 10B. With the output of the head 10A or the head 10B selectively produced in an apposite manner, a signal without any extremely low reproduction level part can be obtained as shown in FIG. 1(d).

In another method for improving the picture quality obtainable by high speed reproduction, the level of a modulated video signal reproduced from a recording tape is monitored; and data for a low level part of the reproduced signal is read out from a memory and is substituted for the low level part. That method also gives a picture without noise bars.

With the former method applied to the so-called two-head helical scanning type reproducing apparatus, however, the apparatus must have at least four heads. Besides, two heads must be arranged closed to each other. This results in a complex head arrangement. Further, the number of grooves of a rotary transmitter increases according as the number of heads increases to result in an increased size of the transmitter. This method is hardly practicable for an apparatus using a compact rotary head type drum, such as the so-called 8-mm VTR.

Meanwhile, the latter method necessitates use of a circuit for monitoring the reproduced level of the modulated video signal. However, the reproduction level of the video signal fluctuates due to changes in the relative positions of the magnetic tape and the head and inconsistencies of the head itself. Therefore, it is difficult to set apposite threshold levels for storing in the memory and for reading from the memory. Such setting is difficult particularly in terms of interchangeability.

Further, the conventional method of obtaining a noiseless reproduced picture by replacing a signal portion for which the reproduced signal is not obtainable in a normal state with information on a similar portion which is stored at the memory for a preceding field presents the following problem: During the process of change-over from writing into the memory to reading from the memory and vice versa, horizontal synchronizing signals obtained before and after the change over tend to deviate in phase from each other. This phase deviation then brings about a skew state. Especially, the skew increases in cases where the above stated high speed reproducing method is applied to the standard mode of an 8-mm VTR.

SUMMARY OF THE INVENTION

A principal object of this invention is to solve the above stated problems presented by the prior art.

It is another object of the invention to provide a video signal reproducing apparatus which is capable of carrying out high speed reproduction causing no noise bar without using an increased number of heads and without necessitating any arrangement to monitor the reproduced level of a modified video signal.

Under this object, a video signal reproducing apparatus arranged according to this invention to reproduce a video signal from a record bearing medium on which the video signal is recorded in many parallel tracks formed on the medium, comprises: a reproducing head arranged to periodically trace the record bearing medium; periodic signal generating means for generating a periodic signal relative to the tracing period of the reproducing head; step-up signal forming means for forming a step-up signal by gradually increasing the periodic signal; storing means arranged to receive the video signal reproduced by the reproducing head and to store one field portion of the video signal; and control means for controlling a writing action on the storing means on the basis of the step-up signal.

It is a further object of the invention to provide a video signal reproducing apparatus which is capable of giving a high-speed reproduced picture having no skew.

Under that object, a video signal reproducing apparatus arranged as another embodiment of this invention comprises: a reproducing head arranged to reproduce a video signal from a record bearing medium; storing means arranged to receive the video signal reproduced by the reproducing head and to store one field portion of the video signal; switching means for changing the state of the storing means from a signal writing state over to a signal reading state and vice versa; address control means for determining the writing address and the reading address of the storing means; detecting means for detecting a phase difference between a horizontal synchronizing signal included in a video signal read out from the storing means and a horizontal synchronizing signal included in a video signal written into the storing means; and means for inhibiting the address control means from renewing the address while an address is being determined on the basis of the phase difference detected by the detecting means.

These and further objects and features of this invention will become apparent from the following detailed description of embodiments thereof taken in connection with the accompanying drawings.

BRIEF DESCRIPTION OF THE DRAWINGS

FIGS. 10(a) to 10(q) and 11(a) to 11(q) show in timing charts the operation of the apparatus shown in FIG. 8.

DETAILED DESCRIPTION OF THE PREFERRED EMBODIMENTS

Figure 2:
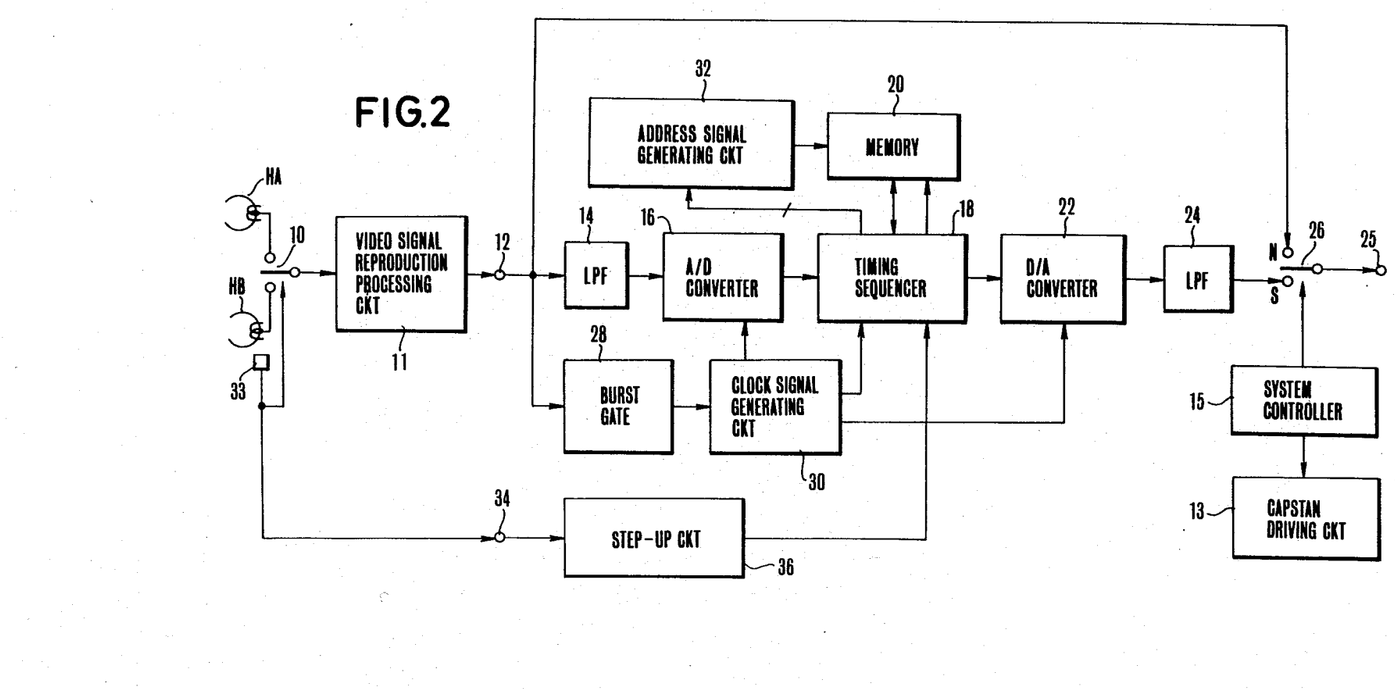
FIG. 2 is a block diagram showing the essential parts of a video signal reproducing apparatus which is arranged according to this invention as an embodiment thereof.

An embodiment of this invention is described with reference to the accompanying drawings as follows: FIG. 2 shows in a block diagram the arrangement of the essential parts of the embodiment. In this case, the invention is applied to a known rotary two-head helical scanning type VTR. Referring to FIG. 2, rotary heads HA and HB have different azimuth angles and are arranged to revolve at a phase difference of 180 degrees from each other. A rotation phase detector 33 is arranged to detect the rotation phases of the rotary heads HA and HB and to produce a rectangular wave signal (hereinafter referred to as PG signal) which is in synchronism with the rotation phase and to have one cycle every time the heads HA and HB make one turn. A head change-over switch 10 is arranged to have its connecting position changed from one position over to another according to the PG signal and to allow the outputs of the heads which are tracing the surface of a tape to be supplied to subsequent circuit elements. A video signal reproduction processing circuit 11 is arranged to bring the video signal produced from the switch 10 back to its original signal form. The video signal thus processed by the circuit 11 is supplied to a terminal 12.

The normal reproducing operation of the VTR is as follows: A system controller 15 produces a control signal to a capstan driving circuit 13 to have a capstan which is not shown cause, in normal reproduction, a recording tape to travel at a speed which is the same as a speed employed in recording. Further, the controller 15 shifts the connecting position of a switch 26 to one side terminal N thereof. This allows the reproduced video signal obtained from the video signal reproduction processing circuit 11 to be produced from an output terminal 25 via the terminal 12 and the terminal N of the switch 26.

The high speed reproducing operation of the VTR is as follows: In the case of high speed reproduction, the system controller 15 produces a control signal to the capstan driving circuit 13 to cause the tape to travel at a speed higher than the recording speed. The controller 15 this time shifts the connecting position of the switch 26 to the other side S thereof. Then, a signal which is processed through a series of circuit elements from the terminal 12 to the switch 26 as will be described later herein is produced from the terminal 25.

In this case, a reproduced composite color video signal is produced from the video signal reproduction processing circuit 11 and is supplied to the terminal 12. The reproduced composite color video signal is then supplied to an A/D (analog-to-digital) converter 16 via a low-pass filter 14 (hereinafter referred to as LPF). The A/D converter 16 converts the input analog video signal into a digital video signal. The digital video signal is supplied to a timing sequencer 18. The sequencer 18 is arranged to exchange the digital video signal with a field memory 20 in accordance with a set operation mode and to supply the video signal to a D/A (digital-to-analog) conveter 22. More specifically, the timing sequencer 18 supplies the digital video signal to the field memory 20 and to the D/A converter 22 in the case of passing the input signal through and in writing the signal into the memory. In reading, the sequencer 18 tranfers the digital video signal read out from the field memory 20 to the D/A converter 22. The D/A converter 22 brings the digital video signal back into the analog composite color video signal and supplies it to the output terminal 25 through an LPF 24.

The reproduced composite color video signal from the input terminal 12 is applied also to a burst gate 28. At the gate 28, a burst signal is extracted and supplied to a clock signal generating circuit 30. The circuit 30 is arranged to generate in synchronism with this color burst signal, a cliock pulse signal of a frequency which is an integer times as high as the subcarrier frequency of a chrominance signal. The clock signal is applied to the A/D converter 16, the timing sequencer 18 and the D/A converter 22. The timing sequencer 18 supplies an RAS (row address strobe) signak, a CAS (column address strobe) signal, a WE (write enable) signal, an OE (output enable) signal, etc. to the field memory 20 as necessary on the basis of this clock signal. The sequencer 18 further supplies an address signal generating circuit 32 with an address clock signal. The circuit 32 generates an address signal for the field memory 20.

The above stated PG signal is supplied to a terminal 34. The step-up circuit 36 steps up the PG signal to obtain a step-up signal and supplies the step-up signal to the timing sequencer 18. The sequencer 18 controls writing and reading actions on the field memory 20 according to this step-up signal.

Figure 3:
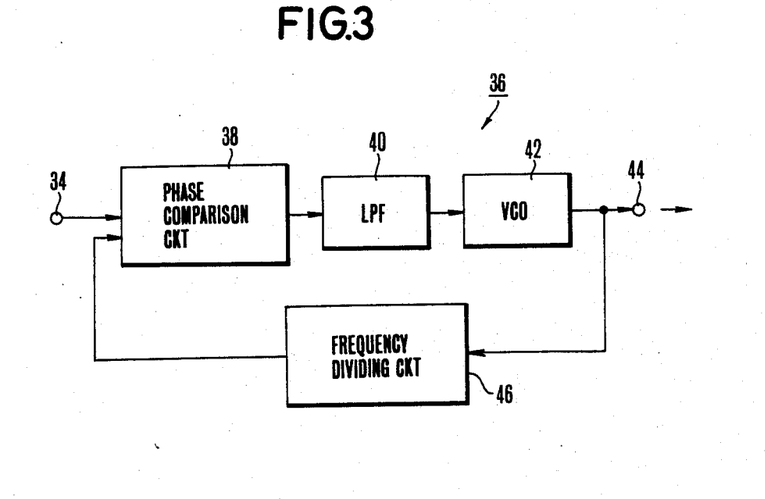
FIG. 3 is a block diagram showing by way of example the arrangement of a step-up circuit included in FIG. 2.

FIG. 3 shows arrangement of the above stated step-up circuit 36. A head change-over signal which is supplied to the input terminal 34 is applied to one of the input terminals of a phase comparison circuit 38. The output of the phase comparison circuit circuit 38 is applied to a voltage controlled oscillation (VCO) circuit 42 via an LPF 40. The VCO circuit 42 oscillates at a frequency corresponding to an input voltage value. The output of the VCO circuit 42 is supplied from an output terminal 44 to the timing sequencer 18. Meanwhile, the output of the VCO circuit 42 is also supplied to a frequency dividing circuit 46. A signal obtained by frequency dividing the output of the VCO circuit 42 is then applied from the frequency dividing circuit 46 to the other input terminal of the phase comparison circuit 38. The circuit 38 also produces a voltage of a value representing a phase difference between the head change-over signal and the signal from the frequency dividing circuit 46. As apparent from FIG. 3, the step-up circuit 36 forms the so-called phase-locked loop (PLL). The output terminal 44 is arranged to produce a step-up signal which is phase locked to the head change-over signal received at the input terminal 34. The stepping up rate of the circuit 36 is equal to the reciprocal number of the frequency dividing rate of the circuit 46.

Figure 4A:
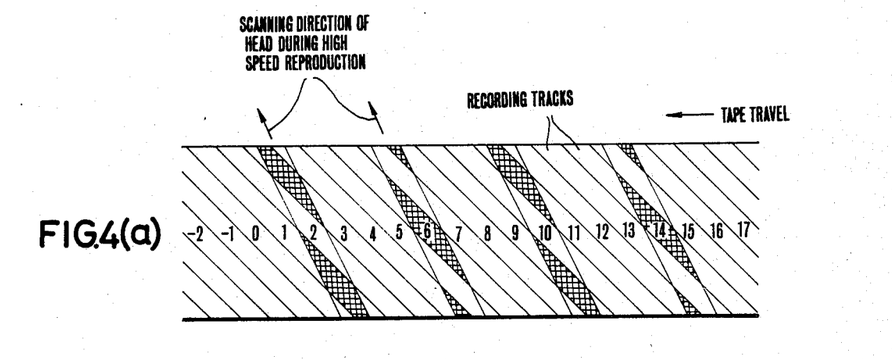
FIGS. 4(a) to 4(e) are illustrations of the operation of the apparatus shown in FIG. 2.
Figures 4B, 4C:
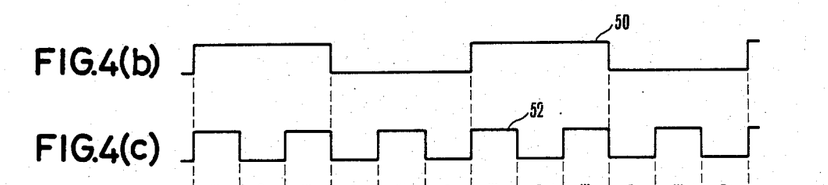
Figure 4D:
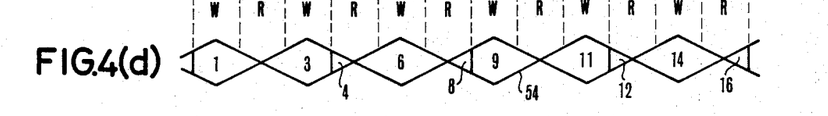

In performing a forward search at a speed four times as high as a recording speed, for example, the circuit arrangement of this embodiment shown in FIG. 2 operates as follows: FIG. 4(a) shows the tracing tracks of the rotary heads obtained on a magnetic tape. In this case, the envelope wave form of a modulated video signal which is thus reproduced becomes as shown in FIG. 4(b). A signal 50 shown in FIG. 4(b) represents the head change-over (PG) signal while a signal 52 shown in FIG. 4(c) represents the output signal of the step-up circuit 36 obtained by stepping up the PG signal. In FIG. 4(d), the crests of the envelope wave form of the reproduced modulated video signal 54 represent the high level periods of the the step-up signal 52 obtained from the head change-over (PG) signal 50. The troughs of the envelope wave form of the reproduced modulated video signal 54 represent the low level periods of the step-up signal 52. The reason for this: Assuming that the tape travel speed for high speed reproduction and the tape speed for normal reproduction are in a ratio n, a modulated video signal having $|n-1|$ pairs of crests and troughs is obtained during the scanning action of the pair of rotary heads, i.e. during the scanning period for two tracks. Therefore, the video signal can be synchronized with the step-up signal which is at a level $|n-1|$ times as high as the head change-over signal by duly adjusting the tracking state of the heads. By this, a correlation can be established as shown in FIGS. 4(c) and 4(d). Further, with the number n set at an even number, the reproduced signal can be always obtained in a normal state as one of the rotary head operates on a corresponding section of the signal preceding by one track scanning period while the other head is scanning a track of different azimuth angle (i.e. a track recorded by the different head).

Figure 4E:
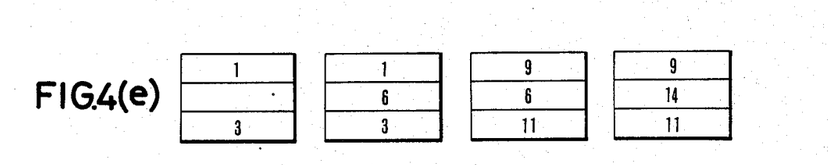

For example, during the high level period of the step-up signal 52 obtained form the head change-over signal, the digital video signal from the A/D converter 16 is written into the field memory 20 and, at the same time, is supplied as it is to the D/A converter 22 to be used as the reproduced signal. During the low level period of the step-up signal 52, the digital signal of the corresponding section which is reproduced one track scanning period before and is stored at the field memory 20 is read out and supplied to the D/A converter 22. In FIG. 4(c), reference symbol W indicates writing into the memory while another symbol R indicates reading from the memory. Through these processes, the terminal S of the switch 26 receives a composite color video signal which is free from noise bars. FIG. 4(e) schematically shows a reproduced picture thus obtained and the variations of the picture. Numerals shown in FIG. 4(e) denote parts corresponding to recording tracks which are numbered as indicated in FIG. 4(a). Further, the frequency dividing circuit 46 of FIG. 3 can be arranged to be a programmable frequency dividing circuit in such a way as to have a frequency dividing rate variable with the speed of high speed reproduction. In that instance, the stepping-up rate of the step-up circuit 36 is variable as the reproducing speed varies, so that the circuit 46 can be arranged to permit a search at a variable speed.

Further, while the step-up circuit 36 is arranged to be a PLL in the case of the embodiment described, the PLL arrangement may be replaced with a arrangement wherein: A counter is arranged to count clock pulses (such as clock pulses for forming addresses), to have the polarity of the output signal thereof inverted when a count value thus obtained reaches a preset value and to be reset by means of the head change-over signal. In accordance with this arrangement, the signal for controlling the writing and reading actions on the memory 20 remains unaffected by any jitter variations of the head change-over signal so that the period of the control signal becomes unvarying. Generally, a step-up circuit having an PLL has poor transient responsivity relative to jitter variations in a reference signal. In the event of a great amount of jitters, there arises some deviation in phase synchronism between the head change-over signal and the step-up signal thereof. In such a case, the step-up circuit using the above stated counter is preferable.

Further, in the case of the embodiment, the data from the A/D converter 16 is written into the field memory 20 and, at the same time, is supplied to the D/A converter 22 when the step-up signal is at a high level; and the data is read out from the memory 20 when the step-up signal is at a low level. This arrangement, however, may be replaced with an arrangement wherein: The memory 20 is arranged to have a memory module which permits simultaneous writing and reading; and the data from the A/D converter 16 is written into the memory 20 when the step-up signal is at a high level while reading from the memory 20 is arranged to be constantly performed.

Figure 5:
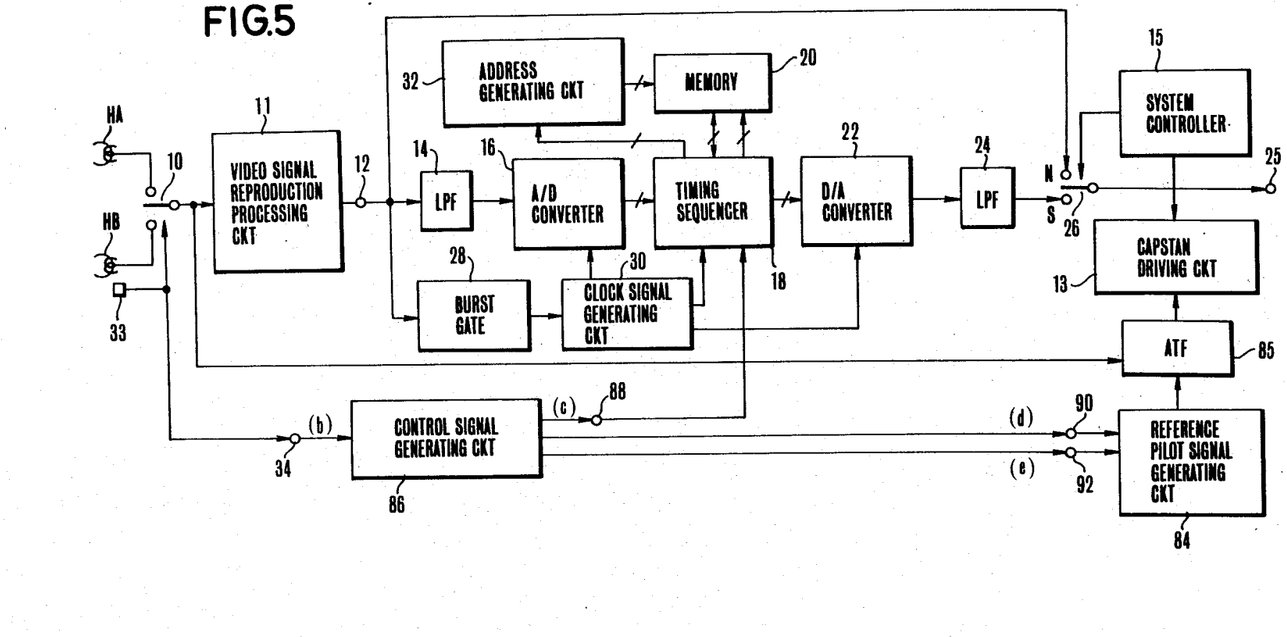
FIG. 5 is a block diagram showing the essential parts of a video signal reproducing apparatus arranged according to this invention as another embodiment thereof.
Figure 6:
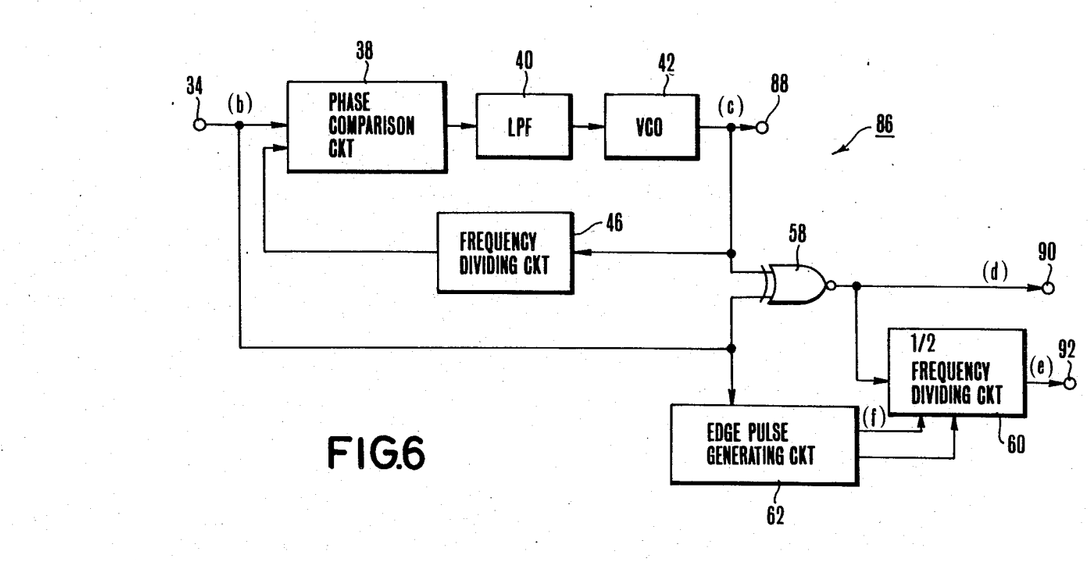
FIG. 6 is a block diagram showing by way of example the arrangement of a control signal generating circuit included in FIG. 5.

FIG. 5 shows the essential part of a VTR arranged as a second embodiment of this invention. The same components as those shown in FIG. 2 are indicated by the same reference numerals. The second embodiment performs a normal reproducing operation in the same manner as in the first embodiment which is shown in FIG. 2. FIG. 6 shows by way of example the arrangement of a control signal generating circuit 86 which is included in the second embodiment shown in FIG. 5. In FIG. 6, the same components as those shown in FIG. 3 is indicated by the same reference numerals and the details of them are omitted from description. Referring to FIGS. 5 and 6, a terminal 88 receives a signal which is similar to the step-up signal produced from the step-up circuit 36 of FIG. 3. In FIG. 5, circuit elements from a terminal 12 through the terminal S of a switch 26 are arranged to perform video signal processing actions in exactly the same manner as in the case of the first embodiment.

Referring to FIG. 6, the output of the VCO circuit 42 is applied also to one of the input terminals of an exclusive NOR circuit 58. The PG signal from the terminal 34 is applied to the outer input terminal of the circuit 58. The ouptut of the exclusive NOR circuit 58 is applied to a terminal 90 and also to a ½ frequency dividing circuit 60. The circuit 60 is arranged to divide by ½ the frequency of the input signal in synchronism with the rise thereof (or with the fall thereof in the case of a search in the reverse direction) and to produce a frequency divided signal from another terminal 92. An edge pulse generating circuit 62 is arranged to receive the head change-over signal from the input terminal 34 and to produce a pulse signal which has a high level for a brief period of time from the rise or fall of the head change-over signal and to apply this pulse signal to the preset control input terminal of the ½ frequency dividing circuit 60. The output of the circuit 60 is at a high level for a period of time during which the level of the preset control input signal is high. However, assuming that the speed of high speed reproduction and that of normal reproduction is in a ratio n, the above stated operaton is performed in the case of $|n-1|=4$ m+3 (wherein m represents either 0 or a positive integer). In the event of $|n-1|=4$ m+1, the pulses on the rise side of the head change-over signal are applied to the preset control input terminal of the ½ frequency dividing circuit 60 and the pulses on the fall side of the signal are applied to the reset control input terminal of the circuit 60.

Figure 7A:
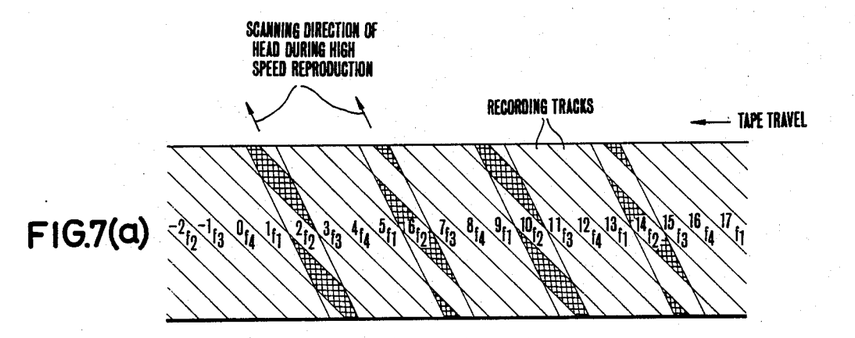
FIGS. 7(a) to 7(h) are illustrations of the operation of the apparatus shown in FIG. 5.
Figure 7B:
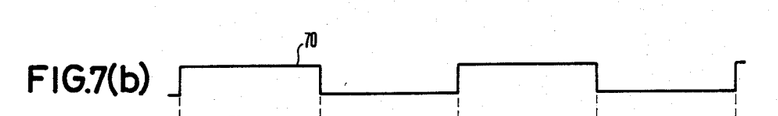
Figure 7C:
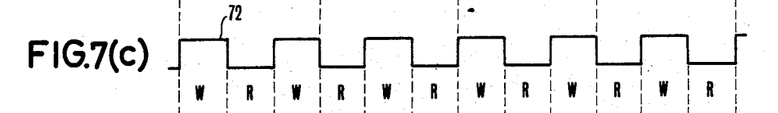
Figure 7D:
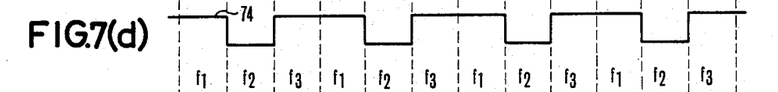
Figures 7E, 7F:
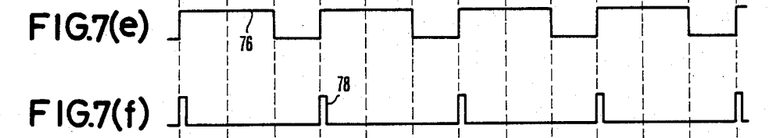
Figure 7G:
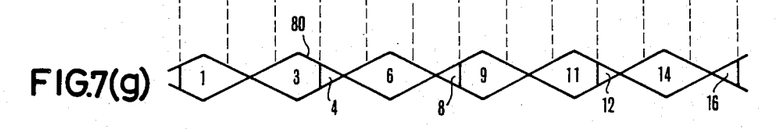
Figure 7H:
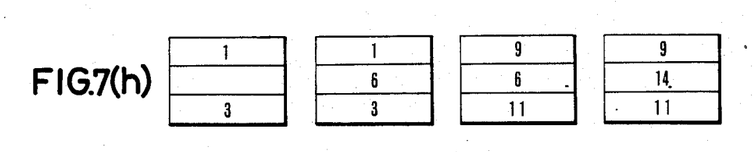

In the case of a search in the forward direction at a speed four time as high as the normal speed, for example, the circuits shown in FIGS. 5 and 6 operate as follows: FIG. 7(b) shows a signal 70 which represents the above stated head change-over signal PG. FIG. 7(c) shows a signal 72 which represents a step-up signal obtained from the PG signal. FIG. 7(d) shows a signal 74 which represents the output of the exclusive NOR circuit 58. FIG. 7(e) shows a signal 76 which represents the output of the ½ frequency dividing circuit 60. FIG. 7(f) shows a signal 78 which represents a reset signal to be applied to the ½ frequency dividing circuit 60. As mentioned in the foregoing, a reset signal is also applied to the circuit 60 in the case of $|n-1|=4$ m+1.

In the event of a tracking control servo device using pilot signals in accordance with the so-called four frequency method which is well known, pilot signals of different frequencies f1, f2, f3 and f4 are recurrently recorded in rotation in the order of f1, f2, f3 and f4, one in every track, during recording. During reproduction of the record, the rotation phase of a capstan is controlled to allow the head to trace the recording tracks in such a way as to have the frequency of each reproduced pilot signal comes to coincide with that of a corresponding reference pilot signal. In other words, a track having a pilot signal record of the same frequency as the frequency of a reference pilot signal becomes a controlled track.

A reference pilot signal generating circuit 84 is arranged, in this case, to produce the reference pilot signals in accordance with combinations of two different input signal A and B as shown in Table 1 below:

TABLE 1

| Signal A: | H | L | H | L |
|---|---|---|---|---|
| Signal B: | H | H | L | L |
| Reference pilot signals: | f1 | f2 | f3 | f4 |

Assuming that the signal A corresponds to the signal 74 of the terminal 90 and the signal B to the signal 76 of the terminal 92, the reference pilot signal generating circuit 84 comes to produce a reference pilot signal of the same frequency as that of a pilot signal recorded in a track mainly traced by the reproducing head. Referring to FIG. 7(a) which shows the tracing tracks or loci of the head, a tracking control (ATF) circuit 85 is arranged to apply tracking control servo control to the tracks one after another. The details of the tracking control circuit 85 is well known and therefore requires no further description.

A capstan driving circuit 13 is arranged to control the tape moving action on the basis of a tracking control signal produced from the ATF circuit 85 and a speed control signal from the system controller 15.

The frequency driving circuit 46 which is arranged as shown in FIG. 6 may be arranged to be a programmable circuit in such a way as to have the frequency dividing rate thereof variable according to the speed of high speed reproduction. In that instance, the stepping up rate of the PLL step-up circuit of the control signal generating circuit 86 varies according to the reproducing speed and, at the same time, pilot signal change-over control signals 74 and 76 at terminals 90 and 92 also vary according to the reproducing speed, so that the circuit 46 thus can be arranged to permit a search at a variable speed.

In accordance with the arrangement described, the second embodiment is capable of tracing the tape with the head in a manner as represented by tracing tracks shown in FIG. 7(a), so that the video signal can be written into the memory at an ideal timing. The second embodiment thus gives an adequately reproduced picture without noise bars even in the event of high speed reproduction.

Figure 8:
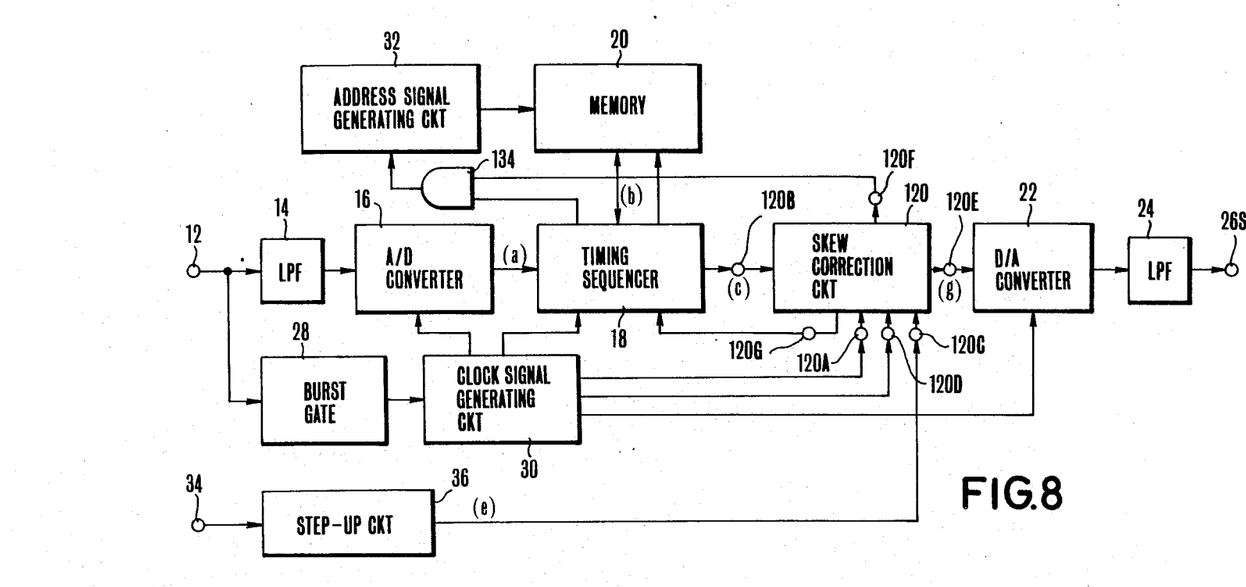
FIG. 8 is a block diagram showing the essential parts of a video signal reproducing apparatus arranged according to the invention as a further embodiment thereof.
Figure 9:
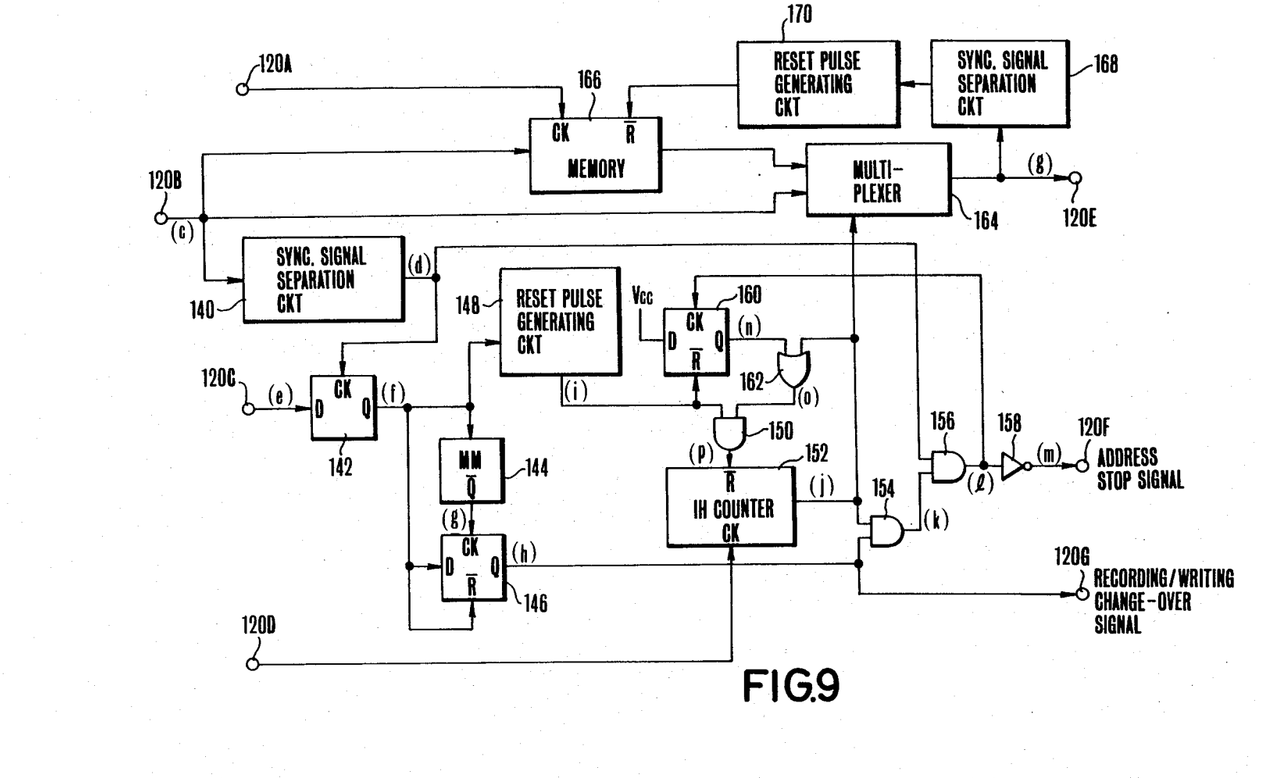
FIG. 9 is a block diagram showing the arrangement of a skew correction circuit which is included in FIG. 8.

FIG. 8 shows a VTR arranged according to this invention as a third embodiment thereof. In FIG. 8, the components similar to those shown in FIG. 2 are indicated by the same reference numerals as in FIG. 2. A step-up signal which is obtained from a head change-over signal PG and is produced from a step-up circuit 36 is supplied to a skew correction circuit 120. In accordance with this signal, the skew correction circuit 120 produces a writing/reading instruction signal for the memory 20 from the output terminal 120G thereof and applies it to a timing sequencer 18. The timing sequencer 18 then controls writing and reading actions on a field memory 20 in response to the instruction signal. The skew correction circuit 120 also supplies a binary signal to an AND circuit 134. The binary signal controls the supply of an address clock signal from the timing sequencer 18 to an address signal generating circuit 32. A feature of the third embodiment resides in the functions of the skew correction circuit 120 and the AND circuit 134 which is provided for control over the address clock signal. The details of the skew correction circuit 120 are as follows: FIG. 9 shows by way of example the arrangement of the skew correction circuit 120. A digital video signal produced from the timing sequencer 18 is applied to the input terminal 120B of the skew correction circuit 120. The circuit 120 includes a synchronizing (hereinafter abbreviated as sync) signal separation circuit 140 The circuit 140 is arranged to separate and produce a horizontal sync signal portion of the digital video signal. A control signal which is produced from a step-up circuit 36 is supplied to the input terminal 120C of the skew correction circuit 120. This control signal is applied to the data input terminal of a D flip-flop (hereinafter referred to as D-FF) 142. Meanwhile, the output of the sync signal separation circuit 140 is applied to the clock input terminal of the D-FF 142. The D-FF 142 is arranged to produce an output retaining the signal state of the data input terminal thereof according to the output of the sync signal separation circuit 140. The output terminal of the D-FF 142 is connected to a monostable multivibrator (hereinafter referred to as MM) 144, the data input terminal and reset input terminal of a D-FF 146 and a reset pulse generating circuit 148. The output terminal of the MM 144 is connected to the clock input terminal of the D-FF 146. The width of the pulse output of the MM 144 is arranged to be larger than that of the pulse output of the sync signal separation circuit 140 for the reason which will be described later. The Q output terminal of the D-FF 146 is connected to an output terminal 120G.

The reset pulse generating circuit 148 is arranged to generate a reset pulse signal the level of which becomes low at the rise of the output of the D-FF 142. This reset pulse signal is applied to one of the input terminals of an AND circuit 150. The output terminal of the AND circuit 150 is connected to the reset terminal of a 1-H counter 152. The counter 152 has a clock signal applied to the clock input terminal thereof from a clock signal generating circuit 30 via an input terminal 120D. The counter 152 is arranged to produce a high level signal during the counting action thereof and a low level signal while it is at rest or after termination of the counting period of 1 H (horizontal sync signal period). The output terminal of the counter 152 is connected to one of the input terminals of an AND circuit 154. To the other input terminal of the AND circuit 154 is connected the output terminal of the D-FF 146. The output terminal of the AND circuit 154 is connected to one of the input terminals of another AND circuit 156 while the other input terminal of the AND circuit 156 is connected to the output terminal of the sync signal separation circuit 140. The AND circuit 156 is arranged to detect the phase of a read-out signal relative to that of a writing signal when a writing action on the memory 20 changes over to a reading action. The output of the AND circuit 156 is arranged to be applied to the AND circuit 134 via an inverter 158 and an output terminal 120F. The output terminal of the AND circuit 156 is also connected to the clock input terminal of a D-FF 160. The D-FF 160 has its data input terminal connected to a power source Vcc, its reset input terminal to the output terminal of a reset pulse generating circuit 148 and its output terminal to one of the input terminals of an OR circuit 162. To the other input terminal of the OR circuit 162 is connected the output terminal of the counter 152. The output terminal of the OR circuit 162 is connected to the other input terminal of the AND circuit 150. The output terminal of the counter 152 is connected also to the control input terminal of a multiplexer 164. An input terminal 120B is connected directly to one of the input terminals of the multiplexer 164 and is connected also to the other input terminal of the multiplexer 164 via a memory 166 which is of a capacity corresponding to a period of 2 Hs (H: horizontal sync signal period). The multiplexer 164 is arranged to produce a signal received from the memory 166 when a control input signal is at a high level and to produce a signal received from the input terminal 120B while the control input signal is at a low level. The output of the multiplexer 164 is applied via an output terminal 120E to the D/A converter 22.

The output of the multiplexer 164 is supplied also to the sync signal separation circuit 168. A horizontal sync signal which is separated by the circuit 168 is supplied to a reset pulse generating circuit 170. The output terminal of the circuit 170 is connected to the reset terminal of the memory 166 and the output of the circuit 170 is used as an address reset signal. To the clock terminal of the memory 166 is supplied a clock signal which comes from the clock signal generating circuit 30 via an input terminal 120A. The memory 166 is arranged to renew the address value thereof in accordance with this clock signal and to begin, at the same time, to take in an input signal. The memory 166 then produces signals one after another by delaying the input signal for a period of 2 Hs at a time. In other words, the memory 166 is arranged to serve also as a delay circuit which operates like a shift register. The delaying degree of the memory 166 is set at the period of 2 Hs for the purpose of making continuous the phase of a chrominance signal having a carrier frequency which is an odd number times as high as ½ fH.

Figure 10A:
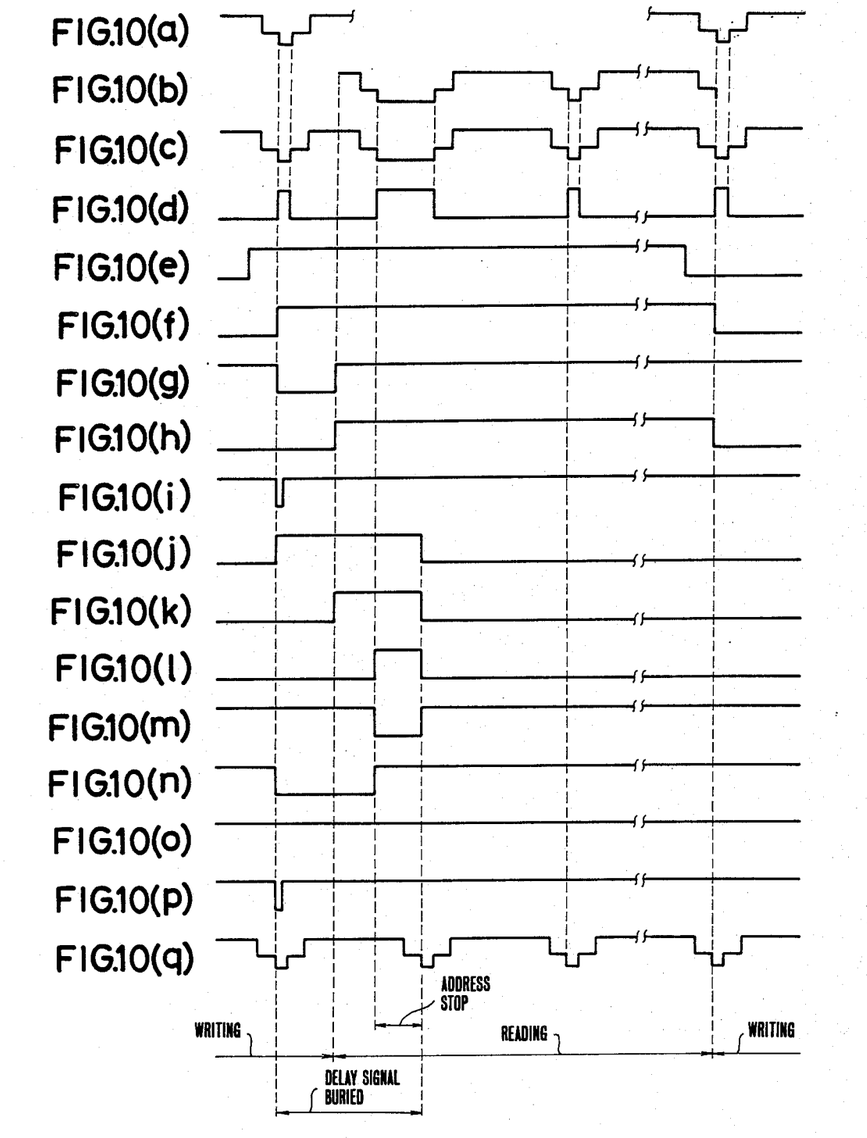

The embodiment illustrated operates as follows: FIGS. 10(a) to 10(q) show in a timing chart the operation performed in case that the phase of a read-out signal is ahead of that of a writing signal and FIGS. 11(a) to 11(q) the operation performed in a reverse case. FIG. 10(a) shows the digital video signal which is produced from the A/D converter 16 and is to be written into the memory 20 as necessary. The illustration shows the digital signal as if it is an analog video signal including only the luminance signal component thereof for easy understanding. When this video signal is applied from the timing sequencer 18 to the input terminal 120B of the skew correction circuit 120, the sync signal separation circuit 140 extracts from the signal only a horizontal sync signal portion thereof and produce a signal which is at a high level only at that portion as shown in FIG. 10(d). The input terminal 120C of the skew correction circuit 120 is arranged to receive, from the step-up circuit 36, a control signal for controlling the timing of writing and reading into and from the memory 20 as shown in FIG. 10(e). The D-FF 142 causes the control signal from the step-up circuit 36 to coincide with the timing of the horizontal sync signal in response to the rise of the horizontal sync signal from the circuit 140 as shown in FIG. 10(f). In response to the output signal of the D-FF 142, the MM 144 produces as shown in FIG. 10(g) a negative pulse which remains at a low level for a given period of time after the rise of this signal. As a result, the D-FF 146 produces a signal which, as shown in FIG. 10(h), delays at the rise part thereof relative to the output signal of the D-FF 142 as much as the set pulse width of the MM 144.

The output signal of the D-FF 146 is sent to the timing sequencer 18 from the output terminal 120G as a signal for reading and writing from and into the memory 20. The timing sequencer 18 writes the output of the A/D converter 16 into the memory 20 when this signal is at a low level and reads out a stored signal from the memory 20 and sends it to the skew correction circuit 120 when the signal from the D-FF 146 is at a high level.

The reset pulse generating circuit 148 generates a reset pulse in response to the rise of the output of the D-FF 142 as shown in FIG. 10(i). This reset pulse passes through the AND circuit 150 and comes to reset the counter 152 as shown in FIG. 10(p). This causes the counter 152 to begin to count the pulses of the clock signal coming to the clock input terminal thereof and produces its output at a high level for the length of time of one horizontal sync signal period. The AND circuit 154 produces a signal the rise of which is delayed, as shown in FIG. 10(k), as much as the width of the pulse produced from the MM 144.

Let use assume that a writing action on the memory 20 is changed over to a reading action with the level of the reading/writing change-over signal from the output terminal 120G to the timing sequencer 18 having changed from a low level to a high level; and that the phase of the writing signal has been quickened by some reason to result in the phase of the signal read out from the memory 20 as shown in FIG. 10(b). Under this condition, the input terminal 120B receives a signal which is as shown in FIG. 10(c). The read-out signal from the memory 20 and the incoming signal received at the input terminal 120B are actually digital signals. However, FIGS. 10(b) and 10(c) show them in the form of analog signals for easy understanding.

If the phase of the read-out signal is ahead of that of the writing signal, the horizontal sync signal comes in while the output of the AND circuit 154 is at a high level. This causes the level of the output of the sync signal separation circuit 140 to become high. Therefore, it is possible to detect whether the phase of the read-out signal is ahead of that of the writing signal by virtue of the output level of the AND circuit 156. Further, to avoid the influence of the horizontal sync signal (FIG. 110(d)) at the start of count by the counter 152, the output of the D-FF 142 is delayed by means of the MM 144. For this purpose, the pulse width of the output of the MM 144 is arranged to be wider than that of the horizontal sync signal. When the horizontal sync signal is supplied to the input terminal 120B, the output of the sync signal separation circuit 140 causes the output level of the AND circuit 156 to become high. Then, the output level of the circuit 156 is inverted to a low level by the inverter 158 and is supplied from the output terminal 120F to one of the input terminals of the AND circuit 134. The AND circuit 134 is closed by this. The address clock signal which is produced from the timing sequencer 18 is then no longer allowed to come to the address signal generating circuit 32. Therefore, when the horizontal sync signal is read out from the memory 20 while the output of the AND circuit 154 is at a high level, the address value of the memory 20 ceases to change. During that period, the horizontal sync signal has only its front edge part recurrently read out.

When the output level of the counter 152 becomes low, the output levels of the AND circuits 154 and 156 become low. The output level of the inverter 158 becomes high. The AND circuit 134 then supplies the address clock signal from the timing sequencer 18 to the address signal generating circuit 32. This causes the address of the memory 20 to advance. As a result, data stored at the memory 20 is gradually read out. In other words, the address of the memory 20 is arranged to be stopped from being renewed only during a period of time corresponding to a phase difference between the signal written into the memory 20 and the signal read out from the memory 20.

The D-FF 160 produces a signal the level of which become high in synchronism with the rise of the output signal of the AND circuit 156. Further, the output signal of the reset pulse generating circuit 148 is applied to the reset input terminal of the D-FF 160. Therefore, the output signal of the D-FF 160 becomes as shown in FIG. 10(n). More specifically, the level of the signal produced from the D-FF 160 becomes low in synchronism with the horizontal sync signal obtained immediately after the rise of the signal coming from the input terminal 120C and becomes high in synchronism with the horizontal sync signal read out from the memory during a period which is approximately equal to one horizontal sync signal period. Since the output level of the D-FF 160 is high, the OR circuit 162 has its output level remain unchanged from a high level as shown in FIG. 10(o). The output of the AND circuit 150, therefore, becomes as shown in FIG. 10(p). After that, the counter 152 no longer receives any reset pulse. In this case, therefore, the counter 152 does not continuously operate.

During the high level period of the output signal of the counter 152, the multiplexer 164 selects the video signal which comes through the memory 166 and supplies it to the output terminal 120E. Therefore, before and after a point of time at which writing into the memory 20 changes over to reading from the memory 20, the signal which is delayed by the memory 166 is used. This effectively prevents any skew from arising due to change from writing over to reading. The signal produced from the output terminal 120E under this condition is as shown in FIG. 10(q). Although the signal from the output terminal E is in the form of a digital signal. FIG. 10(q) shows it as in the form of an analog signal for the sake of illustration. As apparent from FIG. 10(q), a video signal having a continuous phase is produced from the output terminal 120E. With a signal portion which is obtained 2-H period before and used through the memory 166, the phase of the chrominance signal also becomes continuous.

Figure 11A:
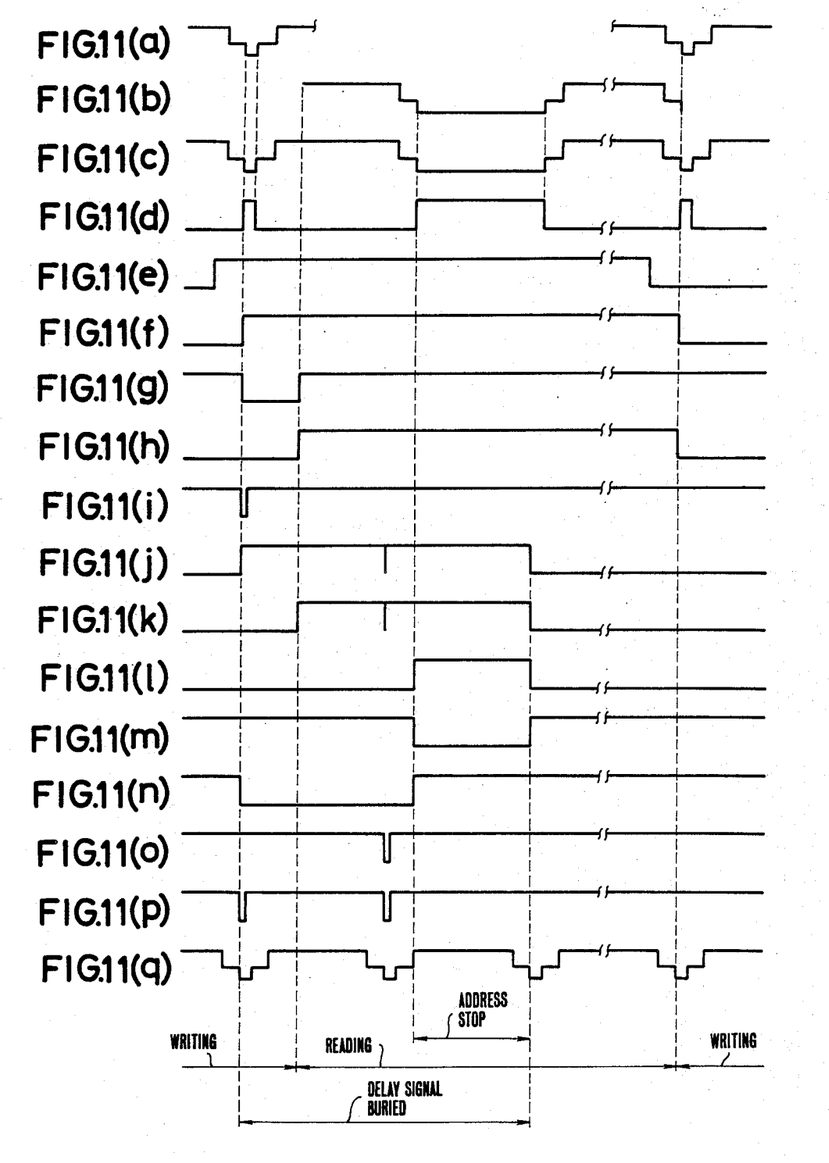

In case that the phase of the read-out signal is behind that of the writing signal, the third embodiment operates as shown in FIGS. 11(a) to 11(q). The signals shown in FIGS. 11(a) to 11(q) correspond respectively to the signals shown in FIGS. 10(a) to 10(q). In this case, the output of the AND circuit 154 which is shown in FIG. 10(k) is not supplied to the terminal 120B during the high level period of the horizontal sync signal. During that period, therefore, the output of the AND circuit 156 is at a low level and that of the inverter 158 at a high level. The address value of the memory 20 is then gradually renewed and data is read out therefrom. However, since the output level of the D-FF 160 remains low when the output level of the counter 152 becomes low with count performed for a 1-H period, the output level of the OR circuit 162 and that of the AND circuit 150 become low to cause the counter 152 to be reset. This resetting action causes the counter 152 to resume its operation. Then, the output level of the counter 152 becomes high. While the output of the counter 152 is at a high level for the period of 1H, the horizontal sync signal is included in the signal read out from the memory 20. After that, therefore, the embodiment operates in the same manner as in the case where the phase of the read-out signal is ahead of that of the writing signal.

The continuous operation of the counter 152 causes a 2-horizontal sync signal period (2H) portion of the video signal to be supplied from the memory 166 to the output terminal 120E. Further, the embodiment operates in the same manner also in cases where the horizontal sync signal fails to come to the input terminal 120B because of some reason such as a drop-out or the like.

When reading from the memory 20 is changed over to writing into the memory, the embodiment operates as follows: When the level of the signal for change-over timing control which comes to the input terminal 120C changes from a high level to a low level, the output level of the D-FF 142 changes from a high level to a low level in synchronism with the horizontal sync signal obtained immediately after the change. At that time, the reset pulse generating circuit 148 is irresponsive to that change and the output level of the circuit 148 remains at a high level. Therefore, the counter 152 does not begin to count. The signal coming to the clock input terminal of the D-FF 146 does not change. However, since the output of the D-FF 142 is applied to the reset terminal of the D-FF 146, the output level of the D-FF 146 changes from a high level to a low level. This low level output of the D-FF 146 is supplied via the output terminal 120G to the timing sequencer 116. As a result, the action on the memory 20 changes from reading to writing.

With the counter 152 thus remaining inoperative, other circuit elements also remain inoperative. The signal from the input terminal 120E is supplied to the D/A converter 122. Therefore, the D/A converter 122 receives the signal supplied thereto with the action on the memory 20 switched from reading to writing in sychronism with the horizontal sync signal included in the read-out signal. Therefore, no skew correction is performed. However, if there is no phase difference between the writing signal and the read-out signal at the time of change-over from writing and reading from the memory 20, a length of time between one horizontal sync signal and another in the writing signal remains almost unchanged from the length of time in the read-out signal. Therefore, there arises either no phase difference or a very slight phase difference between the horizontal sync signal of the read-out signal and that of the writing signal at the time of change-over from reading to writing into the memory 20. The embodiment is, therefore, capable of making the reproduced picture presentable by effecting the change-over at the horizontal sync signal portion of the video signal.

In the third embodiment described, the head change-over signal is supplied to the input terminal 34; a step-up signal is obtained from this change-over signal by means of the step-up circuit 36; and this step-up signal is used as a change-over timing control signal for change-over between writing into and reading from the memory 20. However, this control signal may be replaced with a signal obtained by detecting the level of the reproduced modulated video signal. Such modification is also capable of giving the same advantageous effect as the embodiment.

The embodiment shown in the drawings is capable of completely preventing noise bars from appearing on the reproduced picture.

As apparent from the foregoing description, a high-speed reproduced picture which is free from any skew is obtainable in accordance with this invention. This invention gives a particularly great advantageous effect with the invention applied to a recording-and-reproducing system using a recording track pattern wherein the positions of the horizontal synchronizing signals recorded in adjacent tracks on the recording medium are deviating from each other.

What is claimed is:

1. A video signal reproducing apparatus for reproducing a video signal from a record bearing medium on which said video signal is recorded in many parallel tracks formed on said medium, comprising:
   (a) a reproducing head arranged to periodically trace said record bearing medium;
   (b) periodic signal generating means for generating a periodic signal relative to the tracing period of said reproducing head;
   (c) step-up signal forming means for forming a step-up signal by gradually increasing the periodic signal;
   (d) storing means arranged to receive said video signal reproduced by said reproducing head and to store one field portion of said video signal; and
   (e) control means for controlling video signal writing into said storing means on the basis of said step-up signal.

2. An apparatus according to claim 1, further comprising moving means for moving said record bearing medium in the direction of intersecting said tracks; and setting means for setting the medium moving speed of said moving means at a first speed at which said reproducing head traces the medium in parallel to said tracks and at a second speed which differs from said first speed.

3. An apparatus according to claim 2, further comprising output means arranged to produce a video signal including a video signal portion read out from said storing means when the medium moving speed of said moving means is set at said second speed and to produce a video signal which does not include said video signal portion read out from said storing means when said medium moving speed is set at said first speed.

4. An apparatus according to claim 2, wherein said second speed is $(2 \times n)$ times as high as said first speed, said n being an integer other than 0 and $-1$.

5. An apparatus according to claim 4, wherein said step-up signal is obtained by stepping up said periodic signal by $|(2n-1)|$.

6. An apparatus according to claim 1, further comprising tracking control means which is arranged to control the position of said reproducing head and that of said record bearing medium relative to each other by using a signal reproduced by said reproducing head and said step-up signal.

7. An apparatus according to claim 6, wherein pilot signals of four different kinds having four different frequencies are recorded along with said video signal in said many parallel tracks in rotation, one in each of said tracks; and said tracking control means includes an error detection means which is arranged to form a tracking error finding signal indicative of deviation of the position of said reproducing head from said tracks by using said pilot signal of four different kinds.

8. An apparatus according to claim 7, wherein said error detection means includes a reference signal generating circuit which is arranged to selectively generate one of reference signals of four different kinds corresponding to said four different kinds of said pilot signals; and a reference signal control circuit which is arranged to control said reference signal generating circuit by using said step-up signal.

9. An apparatus according to claim 1, wherein said control means is arranged to switch the state of said storing means between a writing state and a reading state.

10. An apparatus according to claim 9, wherein said step-up signal is a rectangular wave signal having a duty ratio of about 50%; and said control means is arranged to control two different states of said step-up signal by correlating them respectively to the writing state and the reading state of said storing means.

11. A video signal reproducing apparatus comprising:
   (a) a reproducing head arranged to reproduce a video signal from a record bearing medium;

(b) storing means arranged to receive said video signal reproduced by said reproducing head and to be capable of storing one field portion of said video signal;

(c) switching means for changing the state of said storing means from a signal writing state over to a signal reading state and vice versa;

(d) address control means for determining the writing and reading addresses of said storing means;

(e) detecting means for detecting a phase difference between a horizontal synchronizing signal included in a video signal read out from said storing means and a horizontal synchronizing signal included in a video signal written into said storing means; and (f) means for inhibiting said address control means from renewing the address while an address is being determined on the basis of the phase difference detected by said detecting means.

12. An apparatus according to claim 11, wherein said inhibiting means is arranged to inhibit renewal of a reading address determined by said address control means immediately after change-over of said storing means from said writing state to said reading state by said switching means.

13. An apparatus according to claim 12, further comprising replacing means for substituting a video signal read out from said storing means for another video signal during a period during which address renewal is inhibited by said inhibiting means.

14. An apparatus according to claim 13, wherein said replacing means is arranged to replace, during the address renewal inhibiting period of said inhibiting means, a signal read out from said storing means with a video signal written into said storing means immediately before the change-over of said storing means from said writing state to said reading state effected by said switching means.

15. An apparatus according to claim 11, wherein said change-over means is arranged to determine the timing of change-over from said writing state to said reading state on the basis of a horizontal synchronizing signal included in said video signal written into said storing means.

16. An apparatus according to claim 15, wherein said detecting means includes a first detection circuit which is arranged to detect a horizontal synchronizing signal read out from said storing means immediately after said switching means changes said writing sate of said storing means over to said reading state.

17. An apparatus according to claim 16, wherein said detecting means includes a second detection circuit which is arranged to detect a horizontal synchronizing signal written into said storing means immediately before said switching means changes said writing state of said storing means over to said reading state.

18. An apparatus according to claim 17, wherein said inhibiting means is arranged to inhibit address renewal by said address control means during a period from detection of said horizontal synchronizing signal by said first detection circuit until the lapse of an n number (n: an integer which is at least 1) of horizontal synchronizing periods after detection of said horizontal synchronizing signal by said second detection circuit.

19. An apparatus according to claim 11, wherein said address control means includes an address counter which is arranged to count the pulses of a clock signal of a given frequency; and said inhibiting means includes a gate circuit which is arranged to control a supply of said clock signal to said address counter.

20. An apparatus according to claim 11, wherein many parallel tracks are formed on said record bearing medium and there are provided medium moving means for moving said record bearing medium in a direction intersecting said tracks; and a setting means for setting the medium moving speed of said moving means at a first speed at which said reproducing head traces said medium in parallel to said tracks and at a second speed which is higher than said first speed.

21. An apparatus according to claim 20, wherein said reproducing head is arranged to periodically trace said record bearing medium; and said switching means is arranged to operate in accordance with a step-up signal which is obtained by stepping up a periodic signal relative to the tracing period of said reproducing head.

22. A video signal reproducing apparatus comprising:
(a) a reproducing head arranged to reproduce a video signal from a record bearing medium;

(b) storing means arranged to receive said video signal reproduced by said reproducing head and to be capable of storing one field portion of said video signal;

(c) switching means for changing the state of said storing means from a signal writing state over to a signal reading state and vice versa;

(d) detecting means for detecting a phase difference between a horizontal synchronizing signal included in a video signal read out from said storing means and a horizontal synchronizing signal included in a video signal written into said storing means; and (e) control means for controlling signal writing into said storing means and signal reading from said storing means on the basis of said phase difference detected by said detecting means.

* * * * *